Jan. 22, 1924.
J. F. KELLY
COMB
Filed Nov. 29, 1921
1,481,646
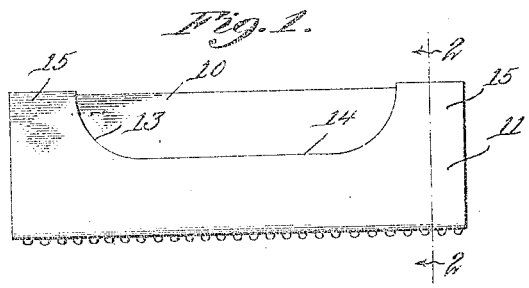
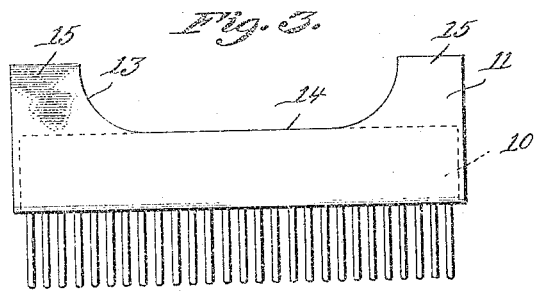
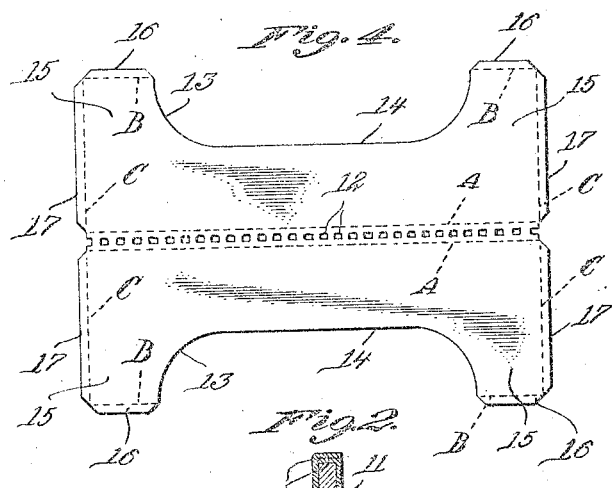
Joseph F. Kelly
INVENTOR
BY Victor J. Evans
ATTORNEY
WITNESS:

Patented Jan. 22, 1924.

1,481,646

UNITED STATES PATENT OFFICE.

JOSEPH F. KELLY, OF FORT DODGE, IOWA, ASSIGNOR OF ONE-HALF TO HARRY J. MARTIN, OF FORT DODGE, IOWA.

COMB.

Application filed November 29, 1921. Serial No. 518,610.

*To all whom it may concern:*

Be it known that I, JOSEPH F. KELLY, a citizen of the United States, residing at Fort Dodge, in the county of Webster and State of Iowa, have invented new and useful Improvements in Combs, of which the following is a specification.

This invention relates to improvements in combs and has for an object to provide a device, which is mounted upon the comb in a manner to permit of the ready use of the latter, or to provide a cover for said comb when not in use.

Another object of this invention is to provide a device adapted for mounting in sliding relation with a comb and arranged for cleaning action on the teeth of the comb in one movement relative thereto.

Another object of the invention is the provision of a comb case constructed so as to prevent detachment from the comb and arranged so that the act of housing the comb within the case, will also act to clean the comb teeth and thereby maintain the same in a sanitary condition.

Another object of the invention is the provision of a comb case which includes the above and other objects and which may be made from a single sheet of metal in a manner to provide a simple, neat and inexpensive article.

With the above and other objects in view, the invention further includes the following novel features and details of construction, to be hereinafter more fully described, illustrated in the accompanying drawings and pointed out in the appended claims.

In the drawings:

Figure 1 is an elevation of the invention.

Figure 2 is a section on the line 2—2 of Figure 1.

Figure 3 is a view similar to Figure 1, showing the position of the comb when the latter is arranged for use.

Figure 4 is a view of the blank from which the comb case is made.

Referring in detail to the drawings, wherein like characters of reference denote corresponding parts, the reference character 10 indicates a comb, which may be of any desired size, the comb shown being of the type usually carried in the pocket. The comb has secured thereto a device 11, which is provided with a plurality of openings 12 for the passage of the teeth. The length of the device is substantially the same as the length of the comb, while the width is slightly less, so as to permit of the comb being received within the device with the extremities of its teeth extending slightly therethrough as illustrated in Figures 1 and 2 of the drawings. The teeth extend from the openings 12 and the latter are of such size as to permit of a free sliding movement of the teeth so that the comb may be arranged in the position shown in Figure 1 when not in use, or moved to the position shown in Figure 3. In this last mentioned position, the device 11 acts as a handle for the comb and in order to prevent the comb from sliding inward within the device, when the said comb is being used, the device is cut away as shown at 13 and the depth of this cut away portion is such that its edge 14 will be substantially flush with the back edge of the comb when the latter is extended. When using the comb, the hand of the user is placed within the cut out portion 13 of the device and the comb is thus prevented from sliding inward within the device.

One of the novel features of the invention resides in the device structure, which is preferably formed of metal. It is cut to the shape shown in Figure 4 and is provided with the openings 12 for the passage of the teeth of the comb. These openings extend longitudinally and centrally of the blank and the latter is folded along the dotted lines *a* so as to provide spaced parallel walls of a width sufficient to receive the width of the comb. The opposite side edges of the blank are cut away to provide the cut out portion 13 and to form tongues 15 which are connected to complete the formation of the device. These tongues are provided with flanges 16 and 17 folded along the dotted lines *b* and *c* respectively. The flanges 16 form the back of the device, while the flanges 17 form the ends of said device, so that the comb is completely enclosed within the device in a manner to prevent detachment. At the same time it may be readily extended so as to move the teeth into position for use.

Thus is provision made for containing the teeth of the comb between portions of the device, which portions lie between the perforations 12 and serve to remove combings from said teeth during and on account of one movement of the device relative to the comb.

The invention is susceptible of various changes in its form, proportions and minor details of construction and the right is herein reserved to make such changes as properly fall within the scope of the appended claims.

Having described the invention what is claimed is:—

1. The combination with a comb, of a device adapted to receive the comb and having perforations along one edge for the passage of the comb teeth and a recess along its opposite edge, the inner edge of the recess being substantially flush with the back edge of the comb when the latter is in position for use.

2. The combination with a comb, of a cleaning device formed from a single blank of material provided with perforations extending centrally and longitudinally thereof and bent upon opposite sides of the perforations to provide spaced walls, the opposite edges of said walls being cut away and forming ears at each end thereof and flanges extending from the ears for overlapping engagement, whereby the spaced walls may be connected.

3. The combination with a comb having teeth of uniform length, of a device mounted in sliding engagement therewith and formed with elements located between the teeth of the comb and adapted, in one movement, to remove substances between said teeth, integral portions of the device extending across the back of the comb, there being a space between the crossing portions of the device exposing the comb for manipulation.

4. The combination with a comb, having teeth of uniform length and of uniform shape, of a device mounted for transverse movement thereon and permanently united therewith, which device is formed with elements alternating with the teeth of the comb and adapted, in one movement, to remove substances between and toward the outer ends of said teeth, integral portions of the device extending across the back of the comb, there being a space between the crossing portions of the device exposing the comb for manipulation.

5. The combination with a comb of a device mounted in sliding engagement therewith and formed with elements located between the teeth of the comb and adapted, in one movement, to remove substances between said teeth, integral portions of the device extending across and between the ends of the back of the comb and in embracing relation therewith, there being a space between the crossing portions of the device, which space is adapted to expose the comb between its ends for manipulation.

In testimony whereof I affix my signature.

JOSEPH F. KELLY.